June 21, 1938. M. W. MORGAN 2,121,507
FLEXIBLE SHAFT COUPLING
Filed June 14, 1937
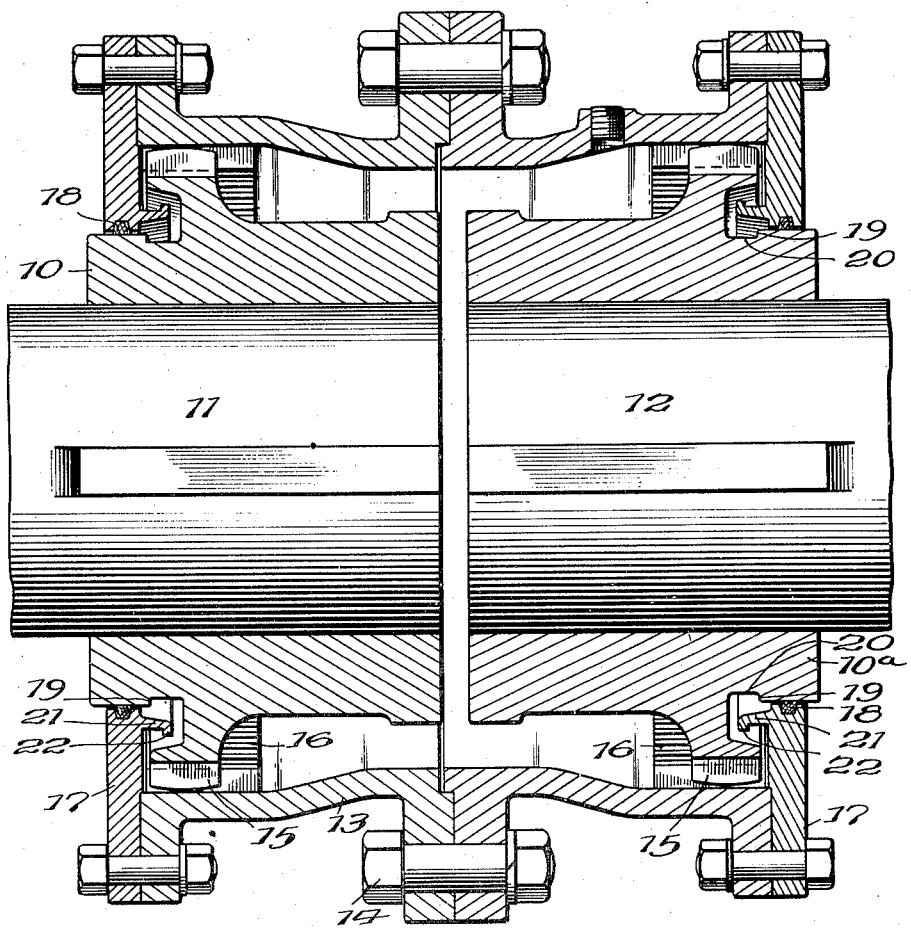
Inventor
Merton W. Morgan,
By Church & Church
His Attorneys Patented June 21, 1938

2,121,507

UNITED STATES PATENT OFFICE 2,121,507

FLEXIBLE SHAFT COUPLING

Merton W. Morgan, Baltimore, Md., assignor to Poole Foundry & Machine Company, Baltimore, Md., a corporation of Maryland Application June 14, 1937, Serial No. 148,183

9 Claims. (Cl. 64—9)

This invention relates to improvements in flexible shaft couplings and, particularly, to that type of coupling wherein motion is transmitted from the driving to the driven shaft by a sleeve member encircling the juxtaposed ends of said shafts.

The primary object of the invention is to provide means for preventing escape or loss of lubricant from the driving sleeve.

In couplings of the type mentioned, the ends of the sleeve are closed by plates which contact the shafts, or hub members on said shafts, to prevent foreign matter gaining access to the interior of the sleeve and contaminating the lubricant usually carried in the sleeve. However, the contact at the points mentioned is not always of a character which will completely seal the oil in the sleeve. As a result, when the coupling is not in operation, oil on the surfaces of the hub members or shafts seeps past the sleeve plates and is lost. In view of these conditions the present invention provides means for preventing oil in the sleeve gaining access to the joint between the sleeve plates and hub members at all times so that it is impossible for the lubricant to escape at these points.

Specifically, the invention contemplates a radial shoulder on each hub member, preferably formed by an annular depression located a short distance from the end plate inwardly of the sleeve and a flange on each plate extending into the sleeve at least to the radial plane on which the depression is located. With this arrangement, oil which has been carried to the upper part of the sleeve by centrifugal force during operation of the coupling will be caught on said flanges when the coupling ceases rotation and will be deflected by said flanges away from the surfaces of the hub members intermediate the depressions and end plates. Also, any oil on the surfaces of the hub members inwardly beyond the depressions cannot possibly reach the points of contact of end plates and hub members by reason of the annular, radial shoulders formed by the depressions.

With these and other objects in view, the invention consists in certain details of construction and combinations and arrangements of parts, all as will hereinafter be more fully described and the novel features thereof particularly pointed out in the appended claims.

In the accompanying drawing, the end portions of the two shafts are shown in elevation, with the remainder of the structure in section, taken vertically, longitudinally of the shafts.

The form of coupling illustrated consists of hub members 10, 10ª, fast on the ends of the driving and driven shafts 11, 12, respectively, and a sleeve 13 having a driving connection with said hubs. The sleeve is formed of sections secured together by bolts 14 for facilitating assembly and disassembly, and the driving connection may take the form of teeth 15 on the hub members engaging in teeth 16 on the interior of the sleeve sections. The crowns of teeth 15 are usually curved to permit rocking of the sleeve thereon and thus compensate for misalinement.

As is understood in the art, a suitable quantity of lubricant is deposited in the sleeve for lubrication of the moving parts, particularly the intermeshing teeth 15, 16, the lubricant being retained in said sleeve by end closures such as plates 17 bolted on the sleeve ends. To prevent dirt and other foreign matter gaining access to the interior of the sleeve and the lubricant, the end plates are adapted to contact the hub members with a small annular body of packing 18 interposed between said parts. This contact, however, must not be too firm and, as a consequence, it does not form a perfect seal for retaining the lubricant in the sleeve, particularly when the coupling is at rest. That is, while shafts and sleeve are rotating, centrifugal action causes the lubricant to spread out on the inner surface of the sleeve in film-like formation of sufficient depth to properly lubricate the teeth 15, 16, but when the coupling comes to rest lubricant in the upper portion of the sleeve will fall or drain onto the surfaces of the hub members and, in the absence of means other than the packing 18, a goodly portion thereof is lost by seeping past said packing.

This loss of lubricant is positively precluded by the present invention which consists of means for preventing lubricant in the sleeve gaining access to or reaching the points at which the packing 18 engages the hub members. For instance, the hub members are provided with radially disposed shoulders 19 spaced from the packing 18 inwardly of sleeve 13, said shoulders preferably being formed by annular recesses 20 in the surfaces of said hub members. With these radial shoulders, lubricant on the surfaces of the hub members at the sides of the shoulders remote from packing 18 cannot flow beyond the shoulders or reach the packing. In addition, means are also provided for preventing lubricant being deposited on the surfaces of the hub members intermediate the shoulders and packing. For this purpose, an annular flange 21 is provided at each end of sleeve 13 overhanging said intermediate portions of the hub members. Preferably, flanges 21 are formed or carried on the end closure plates 17. They extend from said plates into the interior of the sleeves and in the preferred embodiment of the invention, the inner extremity of each flange is turned radially outward, as at 22, so that the outer radial face of the flange is of trough-like formation. On the other hand, the inner radial face of each flange 21 slopes away from the end plate inwardly of the sleeve. The flanges 21 are of such breadth or width that the inner extremity thereof is positioned beyond the shoulder 19 inwardly of the sleeve so that, when the coupling ceases rotating, lubricant in the upper portions of the sleeve will fall either in recesses 20 or in the trough-like surfaces of flanges 21 and drain to the bottom portion of the sleeve. In either event, it cannot reach the surface of either hub member intermediate the recess 20 and packing 18. Lubricant dropping off the hub members from the surfaces of recesses 20 will fall on the inclined surfaces of flanges 21 and drain away from the packing points. It will be understood, of course, that the quantity of lubricant required in the coupling is not sufficient to come up to the level of the hub member surfaces when the shafts are at rest. Thus it is impossible for the lubricant to reach the packing 18 on either hub member and, consequently, there is no loss of lubricant.

What I claim is:

1. In a flexible shaft coupling, the combination with the driving and driven shafts, a hub member on each shaft, a sleeve encircling said hub members, driving connections between each hub member and said sleeve comprising intermeshing elements on the sleeve and hub members, closure plates for the ends of said sleeve each having lubricant-sealing engagement with one of said hub members, of means overlapping said intermeshing elements axially of the shafts for preventing lubricant within the sleeve gravitating onto the surfaces of said hub members adjacent said closure plates, and means for preventing lubricant on the surfaces of said members moving to the point of engagement between said closure plates and their respective hub members.

2. In a flexible shaft coupling, the combination with the driving and driven shafts, hub members on said shafts, a sleeve encircling said hub members, driving connections between said sleeve and each hub member, and plates closing the ends of said sleeve, each plate having a lubricant-sealing contact with one of said hub members, of means adjacent each end of said sleeve and intermediate said driving connections and the ends of said sleeve for preventing lubricant on the surfaces of the hub members moving to the points of contact between said plates and their respective hub members.

3. In a flexible shaft coupling comprising a pair of hub members, a lubricant-retaining sleeve encircling said members, intermeshing teeth on said members and sleeve and closure plates for the ends of said sleeve engaging said hub members, the combination of means for preventing flow of lubricant on the surfaces of said hub members to the points of engagement of said closure plates and means on each closure plate projecting into the same radial plane as said teeth for preventing lubricant in the upper portion of the sleeve falling on said hub members at points between said last-mentioned means and said points of contact.

4. In a flexible shaft coupling comprising a pair of hub members, a lubricant-retaining sleeve encircling said members and having driving engagement therewith, and closure plates for the ends of said sleeve having lubricant-sealing contact with said hub members, said hub members having radial offsets on their surfaces between the points of driving engagement and the points of engagement of said plates and hub members.

5. In a flexible shaft coupling comprising a pair of hub members, a lubricant-retaining sleeve encircling said members and having driving engagement therewith, said driving engagement consisting of intermeshing elements on said members and sleeve, and closure plates for the ends of said sleeve having lubricant-sealing contact with said hub members, said hub members having radial offsets on their surfaces spaced inwardly of the sleeve from the points of engagement of said plates and hub members, and means projecting into the same radial plane as said intermeshing driving elements for preventing lubricant in the upper portion of the sleeve falling on said hub members intermediate said offsets and the points of contact between the hub members and plates.

6. In a flexible shaft coupling comprising a pair of hub members, a lubricant-retaining sleeve encircling said members and having driving engagement therewith, said driving engagement consisting of intermeshing elements on said members and sleeve, and closure plates for the ends of said sleeve having lubricant-sealing contact with said hub members, said hub members having radial offsets on their surfaces spaced inwardly of the sleeve from the points of engagement of said plates and hub members, and flanges on said plates extending into said sleeve, said flanges being located in the same radial planes as the intermeshing driving elements and overlying the surfaces of hub members intermediate said offsets and the points of contact between the closure plates and said members.

7. In a flexible shaft coupling comprising a pair of hub members, a lubricant-retaining sleeve encircling said members and having driving engagement therewith, and closure plates for the ends of said sleeve having lubricant-sealing contact with said hub members, said hub members having radial offsets on their surfaces spaced inwardly of the sleeve from the points of engagement of said plates and hub members, and flanges extending from said plates inwardly of the sleeve in the same radial planes as the portions of the surfaces of the hub members intermediate said offsets and the points of contact between said plates and members, the inner radial faces of said flanges sloping inwardly of said sleeve.

8. In a flexible shaft coupling comprising a pair of hub members, a lubricant-retaining sleeve encircling said members and having driving engagement therewith, and closure plates for the ends of said sleeve having lubricant-sealing contact with said hub members, said hub members having radial offsets on their surfaces spaced inwardly of the sleeve from the points of engagement of said plates and hub members, flanges extending from said plates inwardly of the sleeve in the same radial planes as the portions of the surfaces of the hub members intermediate said offsets and the points of contact between said plates and members, the inner radial faces of said flanges sloping inwardly of said sleeve, and an annular offset at the inner extremity of each flange projecting radially outward with respect to said flanges.

9. In a flexible shaft coupling comprising a pair of hub members, a lubricant-retaining sleeve encircling said members and having driving engagement therewith, and closure plates for the ends of said sleeve having lubricant-sealing contact with said hub members, said hub members having annular depressions therein spaced from said points of contact inwardly with respect to said sleeve, and flanges on said plates extending inwardly of the sleeve into the same radial planes as those in which said depressions are located.

MERTON W. MORGAN.